May 14, 1968   K. O. BRYANT   3,383,681
DIGITAL RANGE UNIT
Filed Jan. 30, 1967   2 Sheets-Sheet 1

INVENTOR.
KENNETH O. BRYANT
BY
ROY MILLER
ATTORNEY.

United States Patent Office 3,383,681
Patented May 14, 1968

3,383,681
DIGITAL RANGE UNIT
Kenneth O. Bryant, Ridgecrest, Calif., assignor to the United States of America as represented by the Secretary of the Navy
Filed Jan. 30, 1967, Ser. No. 613,076
1 Claim. (Cl. 343—7.3)

ABSTRACT OF THE DISCLOSURE

The invention comprises a digital range unit which drives the radar range setting to the slant range of the designated target, generates the necessary signals for display and automatic tracking of the return video and generates and continually updates target range data. In addition, the range unit generates a time-zero signal for the radar synchronizer, triggers the radar transmitter and computes range velocity of the target.

---

The invention described herein may be manufactured and used by or for the Government of the United States of America for governmental purposes without the payment of any royalties thereon or therefor.

The present invention relates to a range unit and more particularly to a digital range unit and specifically, to a digital range unit capable of tracking a constant-velocity target without a steady state range error.

Target-tracking radars require range units and in the past various attempts have been made to provide digital range units that were compatible with analog ranging circuits to allow direct communication between the radars and the now used, general purpose digital computers. In addition to the obvious advantage of obviating the need for conversion devices, digital range units increase tracking accuracy, extend post-tracking capacity and provide range and range-rate information directly to the fire control computers.

An object of the present invention is to provide an improved digital range unit which performs all the functions of the ranging circuits of the typical target-tracking radar.

Another object of the present invention is to provide an improved digital range unit which provides both range and range-rate information in digitized form.

An additional object of the present invention is to provide an improved digital range unit capable of acquiring and tracking without significant error.

Other objects, advantages and novel features of the invention will become apparent from the following detailed description of the invention when considered in conjunction with the accompanying drawings wherein.

Figure 1:
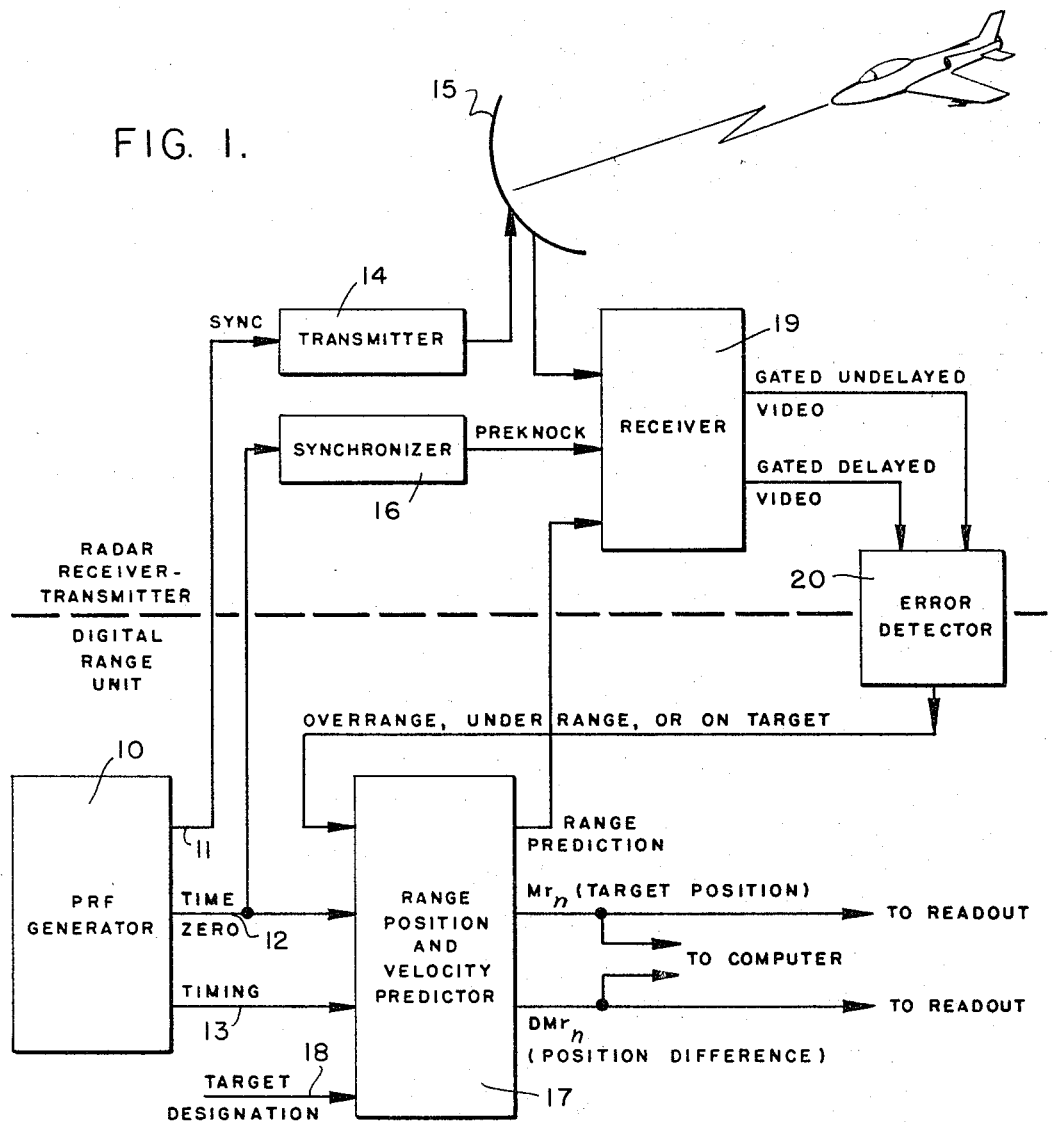
FIG. 1 is a simplified functional diagram of a digital range unit.

In the simplified functional diagram of FIG. 1, a PRF generator 10 provides a synchronization pulse output on line 11, a time zero pulse on line 12 and system timing pulses on line 13. The synch pulse on line 11 is coupled to a transmitter 14 and the output of the transmitter in turn coupled to a radar antenna 15. The time zero pulse on line 12 is coupled to a synchronizer 16 and a range position and velocity predictor 17. The range position and velocity predictor also receives the timing pulses from line 13 and in addition a target designation input on line 18.

A radar receiver 19 is provided which receives an input from the radar antenna 15 and also receives an input corresponding to a preknock pulse from the synchronizer 16.

A range prediction output is also coupled to the receiver 19 from the range position and velocity predictor 17. The receiver has two outputs, one corresponding to a gated undelayed video and the other corresponding to a gated delayed video, both of which are coupled to an error detector 20 which has outputs corresponding to over range, under range, and on target. The output of the detector 20 is coupled to the input of the range position and velocity predictor 17.

The range position and velocity predictor has three outputs (1) the prediction output which is coupled to the receiver 19 and it has a pair of outputs corresponding to (2) the target position output and (3) the position difference output both of which may be coupled to a computer or to readouts. The target position output corresponds to the range position while the position difference corresponds to the velocity or range-rate of the target being tracked.

Figure 1A:
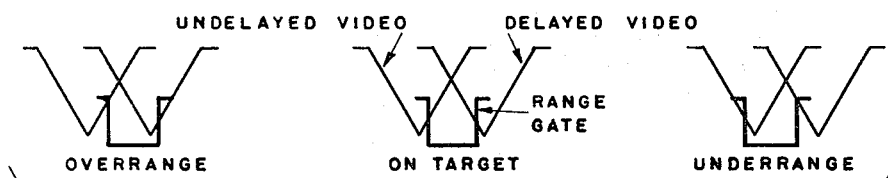
FIG. 1A illustrates the relationship of the video and target and range gates with respect to target returns.

FIG. 1A illustrates the three conditions which may apply when target tracking is underway, i.e., over range, under range, or on target.

Figure 2:
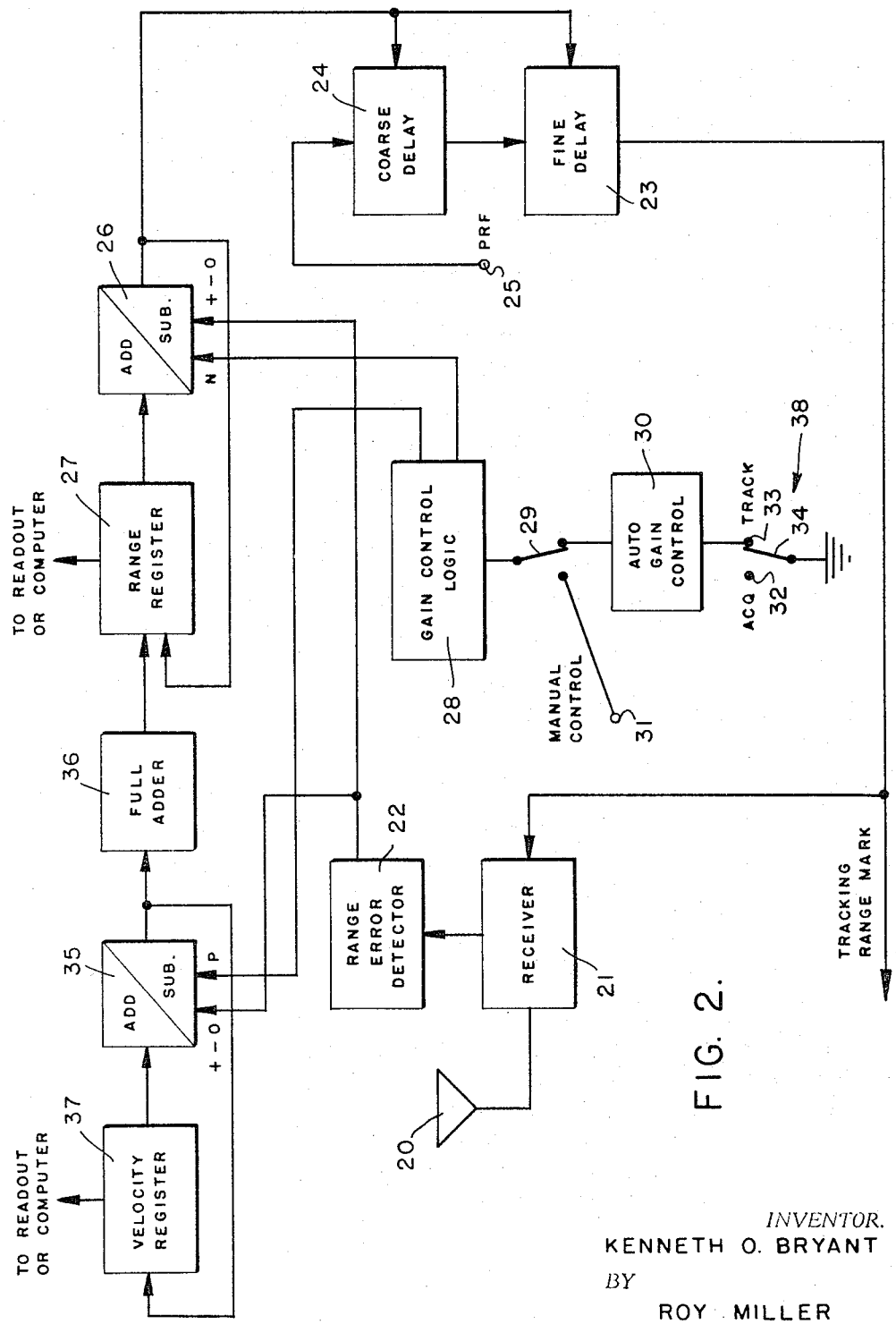
FIG. 2 is a simplified block diagram of the digital range unit.

FIG. 2 is a simplified block diagram of the digital range unit illustrating a radar antenna 20 having an output which is coupled to a receiver 21 which in turn has an output which is coupled to a range error detector 22.

Although various components in the diagrams of FIG. 1 and FIG. 2 correspond, different numerals are used in the figures to obviate any confusion later on in the discussion of the apparatus.

The range error detector, in turn, has outputs which form inputs to add-subtract circuits 26 and 35. Add-subtract circuit 35 receives another input from a velocity or range-rate register 37 whose input comprises the output of the add-subtract circuit 35.

A full-adder 36 receives an input from the output of the add-subtract circuit 35 and has an output which forms one input to a range register 27. Another input to the range register 27 consists of the output from the add-subtract circuit 26.

The output from the add-subtract circuit 26 is also coupled to a coarse delay line 24 and fine delay line 23 in parallel to control the lengths of the delays.

A PRF pulse is coupled in at input 25 to the coarse delay line 24 and the output of the line forms the input to the fine delay line. The output of the fine delay line corresponds to the tracking range mark and is also coupled back as one input to the receiver 21.

The add-subtract circuits 26 and 35 receive other inputs corresponding to N and P, respectively, from a gain control logic circuit which in turn derives an input from a switch 29 which may be switched between a manual control position 31 and the output of an automatic gain control circuit 30. The gain control circuit in turn may derive an input, through switch 38 at switch contact 33 from a "track" or "acquisition" input at the contact. In "track" position a movable switch element 34 is connected to ground. In "acquisition" position the input to the automatic gain control circuit is opened and switch 29 moved to manual position 31.

The velocity or range-rate register and range register also have outputs whch may be utilized as readouts or input to a digital computer.

The digital range unit of the present invention performs all the functions of the ranging circuits of a typical target-tracking radar in that it drives the radar range setting to the slant range of the designated target, generates the necessary signals for display and automatic tracking of the return video, generates and continually updates target range data for a computer and presents the instantaneous slant range of the target on a visual display, if desired. In addition to the standard ranging functions, the range unit generates a time-zero signal for the radar synchronizer, triggers the radar transmitter, computes the range velocity of the target and allows the operator to select either range position or range velocity for the visual display and the computer. The simplified functional diagram of FIG. 1 illustrates the relationship of the digital range unit and its interconnections with a radar receiver-transmitter.

In FIG. 1, the PRF generator 10 sets the pulse repetition frequency of the radar by triggering the transmitter 14 and synchronizes all tracking functions by controlling the radar synchronizer 16. It also generates the basic shift frequency of the computing circuits of the digital range unit by providing a timing pulse on output line 13 to the range position and velocity predictor 17. The PRF generator 10 comprises a precision frequency generator, a frequency multiplier, and a PRF divider. Its outputs include a one kilocycle PRF pulse, whose frequency is chosen in the present case for compatibility with the normal PRF of the associated radar 14. The PRF generator also provides a one megacycle basic shift pulse for the range unit computing circuit. The comparatively high frequency of the shift pulse allows an entire ranging unit computing cycle to be completed during each period that elapses between successive target echoes.

The range position velocity predictor 17 contains the computing and positioning circuits of the range unit. Contained therein are coarse and fine stepped delay networks, two digital integrators, and an arithmetic unit. The main functions of the range position and velocity predictor 17 are to drive the radar range setting to the slant range of the designated target during acquisition and to maintain automatic range tracking after the target has been acquired and gated. Its output to the receiver 19 is a predicted range of the target, expressed as a delay between time zero and expected time of target echo. This signal triggers the receiver range gate which is a 0.2-microsecond pulse whose leading edge represents the predicted range. During acquisition, the predicted range is increased and decreased either by manual control or by a digitized input from a target designation system. After the target has been gated, the ranging circuitry is switched to the automatic tracking mode and the predictor operates in a closed loop with the receiver 19 and the error detector 20.

Upon reception of each target echo, the received video is also delayed .22 microseconds. The delayed and undelayed video pulses are applied to a push-pull comparison circuit where they are gated by the receiver range gate, which represents the latest target-position computation of the predictor 17. The gated video outputs of the comparison circuit to the error detector 20 will be balanced, i.e., of equal amplitude, when the video pulses overlap the leading and trailing edges of the range gate by the same amount (on-target condition), and out of balance in either an over range or an under range direction when the undelayed video occupies less or more of the gate than the delayed video. The various conditions are illustrated in FIG. 1A. The error detector 20 is a digital range unit component and forms the analog-to-digital interface of the ranging loop. It converts the short pulse outputs of the comparison circuit of the receiver 19 to long duration multivibrator waveforms that are applied to the predictor as "add" orders for an under range condition, zero error signals for an on target condition, and "subtract" orders for an over range condition. The above outputs occur at the repetition rates of the target echoes and when indicating that target tracking error has been detected, show the direction but not the amount of the needed correction.

The predictor 17 uses each input from the error detector 20 to update its target-velocity and target-position computation. If no error has been detected, it will retain its previous velocity prediction as a valid representation of actual target velocity, then update its position prediction by adding to it the distance that the target will travel at the computed velocity during one pulse repetition. If an error has been detected, the predictor will first change its velocity computation by adding or subtracting a preset correction factor, then update the position computation by adding to or substracting from the previous position prediction a preset correction factor and adding to that corrected prediction the distance that the target is expected to travel at the newly computed velocity during one pulse repetition.

The updated range prediction is then applied to the receiver 19 where it generates a new range gate (35 yard notch) and another comparison and correction cycle begins as soon as the next target echo is detected and gated. The addition or subtraction of both velocity and position correction factors continues at a one kilocycle rate until the range gate is driven back to the exact range of the target. One kc./sec. was used because the pulse repetition interval in the present case was set at .001 second. The one kc./sec. could be varied to meet system requirements. The error detector 20 will then stop issuing corrective orders and the range loop will "coast" at a constant rate until the target range velocity changes. Such a change will cause an unbalance in the comparison circuits of the receiver 19 and initiate a new cycle of corrections in the velocity and position computations of the predictor 17.

The predictor 17 bases its computations of predicted target velocity on the rate at which the range position of the target changes between echoes. The position difference between two successive echoes ($DMr_n$) is also used to predict the next target position, which is then tested against the actual range of the target-return video during the next pulse repetition.

If no position error is detected the value of the latest velocity prediction is proved correct, and the last computation of position difference ($DMr_{n-1}$) is retained for the next computation cycle: $DM_n=DMr_{n-1}$. A new position prediction ($Mr_n$) is then computed by adding $DMr_n$ to the previous position prediction ($Mr_{n-1}$):

$$Mr_n = Mr_{n-1} + DMr_n$$

in which $DMr_n$ is either positive or negative, depending on whether the target is moving away from or toward the radar.

If a position error is detected the value of position difference is modified according to the equation $$DMr_n = DMr_{n-1} \pm \frac{1}{2P}$$

in which P is a preset arbitrary gain factor that has been selected for smooth loop operation at the velocity rate of change expected from the type of target the radar is intended to track. A similar preset gain factor N is also introduced in the computation of predicted position:

$$Mr_n = \left(Mr_{n-1} \pm \frac{1}{2N}\right) + DMr_n$$

The sign of the $1/2P$ and $1/2N$ functions depends on whether the error detector has issued an "add" or a "subtract" order. Where an under range condition exists, the entire computation for the new position prediction would therefore be $$Mr_n = \left(DMr_{n-1} \pm \frac{1}{2P}\right) + \left(Mr_{n-1} + \frac{1}{2N}\right)$$

and the values of P and N would determine the time (i.e., the number of pulse repetition periods) needed to drive the range gate to within plus or minus one yard of the true target range. The damping curve of the loop is a function of P–N, and the plus or minus one yard tolerance is the accuracy limit of the range unit, set by the 6.25 nanosecond second intervals between the taps of the fine delay network 23 contained within the predictor 17.

In the range unit of an operational radar designed to track a specific class of targets (airplanes, missiles, ships, etc.), P and N would have single fixed values, chosen for optimum loop response to the maneuvering characteristics of the intended targets.

The input from the timing section of FIG. 1 is the PRF pulse at input 25 of FIG. 2, which is delayed by an amount equal to the prediction time and becomes a tracking range mark. Since there is a fixed system delay between the tracking range mark and the 35 yard range gate, varying the tracking range mark notch will vary the 35 yard range gate, which allows the placing of the 35 yard notch in coincidence with the return video.

This coincidence is recognized in the range error detector 22, which outputs signals to the add-subtract circuits 35 and 26 to automatically maintain the coincidence. The value of the least significant bit (LSB) is controlled by the gain control logic 28 and is used in deriving the new value of M$r$ from the DM$r$ and M$r$ data obtained during the previous PRF cycle. The prediction time will be adjusted in the M$r$ range register 27 if an error has existed in the new prediction time translated in the delay line. The new value will change the position of the 35 yard range notch.

The two equations implemented in the digital range unit are $$DMr_n = DMr_{n-1} \pm \frac{1}{2^P} \quad (1)$$

where $DMr_{n-1}$ is the velocity from the previous PRF cycle and P is a preset gain factor that has been selected for smooth loop operation. P is set by the gain control logic 28 and fixes the value of the LSB in the range register 27, plus or minus, if delay time is either too large or too small. $DM_r = DMr_{n-1}$ if no error exists and $$Mr_n = Mr_{n-1} \pm \frac{1}{2^N} + DMr_n \quad (2)$$

where $Mr_{n-1}$ is the range value from the previous cycle, N is a gain factor that has been selected for smooth loop operation (a value assigned by the gain control logic 28) and fixes the value of the LSB in the M$r$ register 27 and $$\left(Mr_{n-1}\frac{1}{2^N}\right)$$

an intermediate step derived before DM$r$ is added. If no error exists $Mr_n$ equals $Mr_{n-1}+DMr_n$.

Range is not arrived at directly but is derived at the readout or computer where the system delays are used in calculating the range value from $Mr_n$. The DM$r$ register 37 is a storage unit that holds the velocity value from the previous PRF cycle. In the M$r$ integrator or range register 27, the new M$r$ value is derived within 30 microseconds after the expected video return and is transferred to the delays 24 and 23 to control the delay time for the next PFR cycle.

In the unit, all operations are performed to generate predicted time values, compare these with the time of the video return from the target, and keep the predicted time within 6.25 microseconds of the return video. The signals responsible for starting the sweeps in the range error detector 22 are generated in the loop containing the DM$r$ and M$r$ registers, although the final calculations for the display of either range or velocity are performed on the output from the velocity register 37 and the range register 27.

The coarse delay 24, which is a preset counter, translates the value of M$r$ in the range register 27 from a radar range number to a time increment. At the beginning of cycle of operation all thirteen stages of the counter comprising the coarse delay 24 are on and therefore, it is only necessary to transfer the corresponding zeros from the M$r$ or range register 27. Each flip-flop in the coarse delay is enabled by the output of its corresponding flip-flop in the range register 27 and on signal the respective zeros of the M$r_n$ integrator 27 are dumped in parallel into the coarse delay counter 24. Since the other bits are already binary ones, the effect is that the contents of M$r$ are transferred to the coarse delay counter. The counter 24 then starts counting down until all of the flip-flops reach zero. When all of the flip-flops in the coarse delay are at zero the fine delay line 23 is enabled and a 0.2 microsecond wide pulse is conveyed down the delay line 23. When all of the flip-flops of the coarse delay 24 count to zero the continuation of the counter for one clock period past the zero count sets all of the flip-flops in the counter 24 to one for the beginning of the next counting period.

The 0.2 microsecond wide pulse out of the coarse delay 24 is transmitted through the fine delay line 23 and becomes the tracking range mark for the pulse generator in the associated radar. The total time of delay is controlled by the output of the M$r$ integrator 27. The radar range values are translated into 100 microseconds time intervals by the coarse delay 24 and the remainder, some value between zero and 93.75 nanoseconds, is translated in the fine delay line 23. Four stages of the range register 27 are dumped in parallel into the fine delay 23 to control the fine delay switching matrix in order to control the amount of delay that is inserted in series with the output of the coarse delay 24.

The range error detector 22 uses the 35 yard range notch along with the delayed and non-delayed video signals from the post-IF amplifier of the receiver 21. Two delay multivibrators (not shown) within the receiver 21 output signals to denote over range and under range conditions and a third initiates the calculations in the register add-subtract circuits 35 and 26, respectively.

The error between the predicted and the actual range of the returned echo determines the direction in which the 35 yard range notch must be moved to coincide with the next echo. If the echo is ahead of or behind the 35 yard notch a signal causes the radar range value of the M$r$ and DM$r$ integrators 27 and 37, respectively, to be increased or decreased by an amount fixed by N and P corresponding to the previously set forth equations.

The delayed and nondelayed video signals are applied to a differential amplifier (not shown) contained in the range error detector 22 where they are combined to produce outputs which turn on appropriate delay multivibrators.

The signals from the differential amplifier are such that if one quantity is positive, the other will be negative and only one delay multivibrator will be triggered.

The delay multivibrators indicating over range and under range do not trigger precisely at the same time and a third delay multivibrator tells which triggers, regardless of the presence or absence of error.

The gain control logic 28 controls the amount by which the information in the velocity register 37 and range register 27 are updated upon each radar return. The least significant bit values in the M$r$ and DM$r$ registers 27 and 37, respectively, determine the gain of the loop, and the difference (P–N) defines the damping curve of the loop.

In the velocity integrator 37, the values of P are 4, 6, 8, 10 and 13 yielding LSB values of $1/2^4$, $1/2^6$, $1/2^8$, etc. The corresponding values of N are —3, —1, 1, 3, and 6, giving a constant difference of 7 in the present unit. Once acquisition has occurred, which is a manual function, the P and N values are changed automatically by the gain control logic at set times according to the output of the PRF counter of FIG. 1.

The output of the range error detector 22 determines whether the velocity value in the DM$r$ integrator 37 remains the same or whether it is increased or decreased by the value of the least significant bit. The gain control logic 28 determines the value of the LSB and the add-one, subtract-one operations. The sign function comes from the range error detector 22 and controls the operation of the add-subtract circuits 35 and 26 which control the updating of the velocity register 37 and range register 27, respectively. In the case of an on range signal the content of the DMr register 37 recycles without being changed. If the 35 yard notch comes before the delayed video and needs to be extended in time the velocity register when cycling through the add-subtract circuit 35 is updated by the value of P under command of the range error detector 22.

Addition and subtraction are accomplished by special complementing in the add-subtract circuits 35 and 26 with the content of the register cycling through with the LSB first. The value recycled through the registers, for example, the velocity register 37 is increased or decreased by one LSB count, which varies in value with P set by the gain control logic 28. The result, at the end of one cycle of operation for the velocity loop is either $$DMr_n = DMr_{n-1} + \frac{1}{{}_2P}$$

or $$DMr_n = DMr_{n-1} - \frac{1}{{}_2P}$$

or $$DMr_n = DMr_{n-1}$$

The output of the velocity register or integrator 37 is used in the calculation of the new range value Mr in a similar manner and thus no explanation is deemed necessary.

The full adder which couples the contents of the velocity register 37 input into the range register 27 accomplishes its operation in a standard manner. The full adder 26 accomplishes the operation set forth in Equation 2 and a new Mr value is shifted back into the range register 27 after being treated in the add-subtract circuit 26.

The apparatus may also be corrected to operate when the Pulse Repetition Period (PRP) is not constant.

When the PRP is a constant and $\Delta R/PRP$ is used as the range rate, it is only necessary to record $\Delta R$ and scale the recording to obtain the recorded range velocity R. However, if the PRP is variable, $\Delta R$ must change as the PRP changes since $\Delta R$ is the range increment added to R for each pulse. For example, if the PRP were instantaneously doubled, then $\Delta R$ would have to be doubled instantaneously also to maintain the constant.

One method of freeing the system from the effects of a variable PRP, when it is desirable to continue to add $\Delta R$ to R at each PRP, is to measure the PRP with a time interval counter which will provide a number equal to the time period times the clock frequency of the counter. Thus, if the period of time equals the PRP and the clock frequency equals D, the number of counts in the counter equals $(PRP)D$. If the contents of the counter are multiplied by $\Delta R$ there is a new number equal to $$(\Delta R)(PRP)(D)$$

which becomes $\Delta R$, for that particular PRP. Then, if $\Delta R$ is added to R at that particular PRP, the range rate becomes:

$$\frac{\Delta R}{PRP} = \frac{\Delta R(PRP)D}{PRP} = \Delta RD$$

In that clock frequency, D is a constant, $\Delta R$, when scaled by D, can be recorded independently of the variations in the PRP.

Although the above would solve the problem of a variable PRP, other system parameters would be affected. The maximum rate of change of $\Delta R$ is still $$\left(\frac{1}{{}_2P}\right) \text{ yd./sec.}$$

however, since $(\Delta R)D(PRP)$ is the quantity added to R each PRP, the maximum acceleration capability would become $$\frac{D(PRP)}{{}_2P_{(PRP)^2}} = \frac{D}{{}_2P_{PRP}} \text{ yd./sec.}^2$$

and the error in the quantity recorded for R would be:

$$\frac{\text{acceleration}}{D} \cdot \frac{1}{{}_2N_{(PRP)}} = \text{acceleration } 2 \frac{(P-N)}{D} \text{ yd./sec.}$$

Therefore, the quantity recorded for R and the maximum capability of the system would be changed by the factor $PRP/D$ for a variable PRP.

Obviously, many modifications and variations of the present invention are possible in the light of the above teachings, It is therefore to be understood that within the scope of the appended claim the invention may be practiced otherwise than as specifically described.

What is claimed is:

1. A non-linear digital range unit for predicting time of arrival of echo returns from a target, comparing the predicted time of arrival with the actual time of arrival of returns from a target and maintaining the predicted time of arrival within 6.25 microseconds of the actual return comprising;

input means adapted to receive a pulse corresponding to a time-zero pulse;

delay means having inputs and an output, one of said inputs being operatively connected to said input means for delaying said time-zero pulse by a predetermined amount;

said delay means incorporating coarse and fine delay lines comprising counters;

receiver means operatively receiving said delayed time-zero pulse and actual returns from a target;

range error detection means operatively connected to said receiver means for receiving said delayed time-zero pulse and actual returns and determining whether said delayed time-zero pulse is over, under or on time with respect to an actual target return and generating a plus, minus or zero signal dependent on the determination mode;

gain control logic having outputs corresponding to P and N where P has values of 4, 6, 8, 10 and 13 and N has values of −3, −1, 1, 3 and 6;

velocity computing means operatively connected to said range error detection means and said gain control logic for computing $$DMr_n = DMr_{n-1} \pm \frac{1}{{}_2P}$$

where $DMr_{n-1}$ is a velocity value from a previous pluse repetition frequency cycle;

said velocity computing means including a register;

the value of P being operative to fix the value of the LSB in said register under control of the output of the range error detector;

range computing means operatively connected to said velocity computing means and said range error detection means and the gain control logic for computing $$Mr_n = Mr_{n-1} \pm \frac{1}{{}_2N} + DMr_n$$

where $Mr_{n-1}$ is the range value from a previous PRF cycle;

said range computing means also including another register;

the value of N being operative to fix the value of the LSB in said another register under control of the output of the range error detection means;

the output of said range computing means being connected to said delay means for determining the amount of delay set into the coarse and fine delays.

References Cited

UNITED STATES PATENTS 3,246,324  4/1966  Price _____ 343—7.3

RODNEY D. BENNETT, *Primary Examiner.*

C. L. WHITHAM, *Assistant Examiner.*